Nov. 13, 1951  I. M. HOLMES  2,574,787
TRANSMISSION CONTROL SWITCH
Filed Jan. 21, 1949

INVENTOR.
Ira M. Holmes,
BY
Harness and Harris
ATTORNEYS.

Patented Nov. 13, 1951

2,574,787

UNITED STATES PATENT OFFICE 2,574,787

TRANSMISSION CONTROL SWITCH

Ira M. Holmes, Detroit, Mich., assignor to Chrysler Corporation, Highland Park, Mich., a corporation of Delaware Application January 21, 1949, Serial No. 71,874

3 Claims. (Cl. 200—59)

This invention relates to a transmission control mechanism for an automotive vehicle and more particularly to means to control the initiation of a change in transmission speed ratio drive.

Reference will be made herein to a relatively fast speed drive which is usually the cruising drive for a vehicle. This may, for example, be a one to one driving speed ratio known as a direct drive or an overdrive. Reference will also be made to a relatively slow speed drive which is a vehicle accelerating speed ratio drive and may be a torque multiplying drive, or where an overdrive is provided for the relatively fast speed drive the relatively slow speed drive may be a direct drive. The term kickdown, as used herein, refers to a downshift or step-down in the transmission as, for example, a downshift from the relatively fast speed drive to the relatively slow speed drive.

In automotive vehicles having automatic controls associated with variable speed ratio transmissions it has been found desirable to provide means responsive to control by the operator for reverting to a relatively slow speed drive when the operator is confronted with an emergency demanding fast acceleration. Such means have usually included a solenoid actuator and controls therefor including a switch which is arranged to cooperate with the engine carburetor throttle control mechanism so as to cause a change in speed ratio drive of the vehicle when the usual accelerator pedal is depressed to a predetermined position. It has also been found with such arrangements that under certain conditions as where the vehicle is traveling at a comparatively high rate of speed the transmission cannot be safely operated in a relatively slow speed drive, as above described, due to the excessive engine speed which would be required. Means have heretofore been provided for limiting the operation of such controls to those engine and vehicle speeds in which a relatively slow speed drive may be safely accommodated.

It is an object of this invention to provide an improved control for a variable speed ratio transmission by means of which a solenoid actuator associated with the transmission may be actuated to effect a change in transmission speed ratio drive by positioning the throttle control linkage in a predetermined position and to associate with this control a means to maintain the condition of the control so established after the throttle control linkage has retracted from the above predetermined position. The speed ratio drive effected by the solenoid is thus maintained after the throttle control linkage has been moved from the above predetermined position.

The transmissions illustrated and described in Patent No. 2,348,763 issued on May 16, 1944 to A. J. Syrovy et al. and the copending application, Serial No. 374,674 of Neracher et al. are examples of transmissions to which the controls to be described herein may be applied.

Latching means adapted to accomplish the above purpose are described and claimed in the copending applications of Louis B. Forman, Serial No. 71,933, field January 21, 1949, and Thomas M. Ball, Serial No. 71,871, filed January 21, 1949.

In the drawings.

Figure 1:
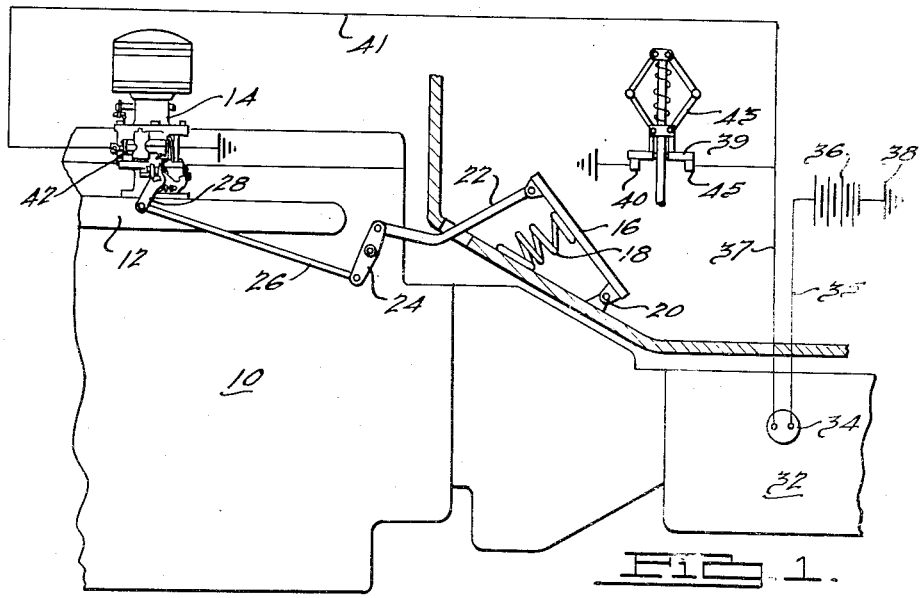
Fig. 1 is a diagrammatic view showing a portion of an automotive engine including a carburetor and a power transmission with the present invention applied thereto.
Figure 4:
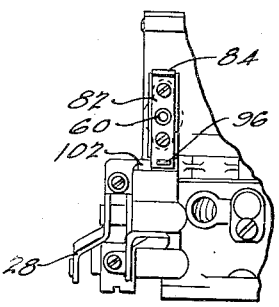
Fig. 4 is a partial elevation of the device illustrated in Fig. 3.

Certain abbreviated terminology will be adopted herein to facilitate the description of the invention. The means associated with the throttle control linkage and which is adapted to cause a relatively slow speed drive to be effected will be hereinafter referred to as a kickdown control. The means which limits the operation of the kickdown control to certain engine and vehicle speeds will be referred to as an upper limit control.

It is apparent that the control desired herein should be associated with some manipulation of the throttle linkage which will signal the operator's desire for an upshift and yet permit some latitude of vehicle operation with respect to engine speed during the relatively slow speed drive. The control, therefore, should be designed to initiate an upshift as the throttle is brought towards a throttle closing position beyond the lower limit of throttle opening that would normally be desired in the operation of the vehicle in its relatively slow speed drive.

The numeral 10 generally indicates an internal combustion engine having an intake manifold 12 on which is mounted a carburetor 14. The carburetor is provided with a convention throttle valve 15 (Fig. 3) which is adapted to be manipulated by movement of an accelerator pedal 16. The pedal 16 is yieldably urged to its throttle closing position by a spring 18. Pedal 16 which is pivotally mounted at 20 has linkage operatively connected thereto for remote control of the throttle and this linkage is indicated by the numerals 22, 24, 26, 28 and shaft 30.

A variable speed ratio transmission has been generally indicated by the numeral 32 and is positioned rearwardly of the engine 10 and adapted to transmit drive from the engine 10 to a propeller shaft (not shown). U. S. Patent No. 2,348,763 and copending application, Serial No. 374,674, illustrate transmissions which could be controlled by the apparatus to be described herein. A solenoid actuator 34 illustrated as mounted on the side of the transmission 32 may be associated with the transmission control apparatus so that energization of the solenoid actuator 34 will effect a kickdown or downshift of the transmission to a relatively slow speed drive. Deenergization of the solenoid actuator 34 may be utilized to effect an upshift of the transmission to a relatively fast speed drive.

In Fig. 1 a typical circuit with which my invention may be associated for the control of the energization of solenoid actuator 34 has been illustrated as including a vehicle storage battery 36 which is grounded at 38. The circuit from the battery includes a conductor 35 connecting the battery to the solenoid actuator 34, a conductor 37 connecting solenoid actuator 34 to a grounded vehicle speed responsive governor 43 having terminals 40 and 45 and switch means 39 to electrically connect these terminals when the vehicle speed is less than a predetermined value. The circuit also includes a grounded kickdown control switch 42 incorporating my invention and connected by a conductor 41 to the conductor 37 so that the governor switch 39 and kickdown switch 42 are in parallel. The switches 39 and 42 are each operable when closed to ground the circuit. The governor 43 may be of any suitable design which is operatively connected to a driven portion of the transmission.

Operation of the kickdown control to be discussed herein is limited to those occasions on which the predetermined vehicle speed controlling the governor 43 has been exceeded so that the terminals 40 and 45 are not electrically connected. A kickdown control is not necessary below this predetermined speed as the governor switch 39 provides an energization of solenoid actuator 34 and a relatively slow speed drive.

Figure 2:
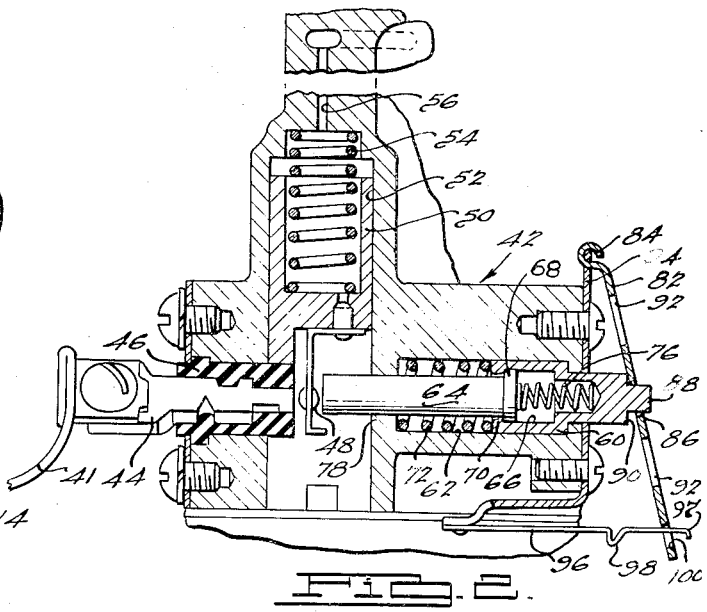
Fig. 2 is an enlarged sectional view illustrating the control mechanism applied to the carburetor shown in Fig. 1, a portion of the carburetor being broken away.

The kickdown control switch 42 is illustrated in detail in Figure 2. An electrical conductor 41, previously referred to, is connected with a first conductor terminal 44 which is electrically insulated at 46 from the supporting carburetor parts. A movable contacting conductor 48 of silver, or other suitable material, is connected to and extends downwardly from a piston 50. The conductor 48 is free from engagement with the first terminal 44 prior to operation of the kickdown control mechanism as hereinafter described. Conductor 48 is sufficiently resilient so that it can be flexed into contact with the terminal 44 and will assume its Figure 2 position again when the parts are in position as shown.

The piston 50 which is the movable portion of the upper limit control previously referred to is free to slide in a cylinder 52 and is urged downwardly therein by a spring 54 until the piston engages the insulation 46. The upper end of the piston is open to receive the spring 54 and the interior of cylinder 52 is connected by a passage 56 to the engine intake at the atmospheric side of the throttle valve 15 so that the piston 50 is always subjected to the vacuum existing on the atmospheric side of the throttle valve. It is preferable if the passage 56 is connected to the throat of the conventional carburetor venturi (not shown).

The spring 54 yieldably urges the piston 50 downwardly to the position illustrated in Figure 2 to position the contact 48 in line with the fixed terminal 44 for engagement therewith under the influence of the control mechanism unless the vacuum in the intake and passage 56 is sufficient to withdraw piston 50 and contact 48 upwardly out of alignment with the terminal 44.

Figure 3:
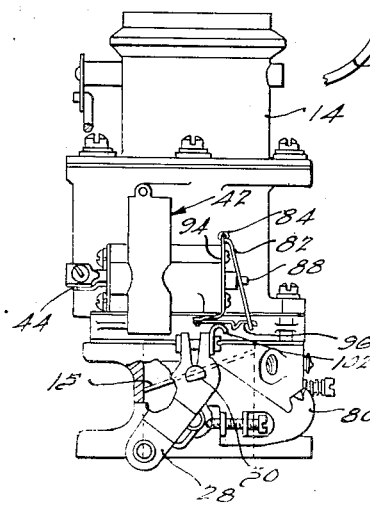
Fig. 3 is a side elevation of the carburetor and control of Fig. 1.

Means are provided herein which are responsive to operation of the throttle control mechanism during a portion of its throttle opening movement and preferably during that portion thereof when the accelerator pedal 16 is brought to its fully depressed position corresponding to approximately full open position of the throttle valve 15, or an over-travel of the pedal beyond the full open throttle valve position, to ground the conductor 44 through contact 48. A plunger-like member 60 is slidably mounted in a cylinder 62 formed in the housing of switch 42. A second plunger-like member 64 is slidably received in a bore 66 provided in member 60. The members 60 and 64 are retained against relative separation in an axial direction by an enlarged portion 68 of the member 64 cooperating with an inwardly directed flange 70 carried by the member 60. The members 60 and 64 are yieldably urged to their Figure 2 position by a relatively heavy spring 72. A spring 76 interposed directly between the members 60 and 64 urges the enlarged portion of the member 64 to the left as viewed in Figure 2 against the flange 70 of the member 60. The lever 28 which forms a part of the linkage connecting the accelerator pedal with the throttle valve, and which was previously referred to, is illustrated in Figure 3 as provided with an extension 80 adapted to force the member 60 to the left in Figure 2 when the pedal is depressed so that the throttle valve 15 is in substantially wide open throttle position. If desired, the contact of extension 80 with member 60 may be adjusted to occur in response to an overtravel of the pedal 16 beyond full open throttle position. In either event the extension 80 applies an axial force tending to move the member 60 to the left in Fig. 2 in response to contact of these parts. This movement occurs against the opposition of spring 72 and the plunger like member 64 is yieldably forced to the left in Fig. 2 by spring 76 until it flexes the contact terminal 48 into contact with the terminal 44. The conductor 41 is thus grounded through 44, 48, 64 and the parts within the bore 62 which are in electrical connection with the carburetor casing.

When, however, the vacuum on the atmospheric side of the throttle valve is sufficient to draw the piston 50 upwardly against the force of the spring 54 and thereby dispose the contact 48 out of alignment with the terminal 44 depression of the accelerator pedal 16, as aforesaid, will not result in formation of the grounded electric circuit for the parts are so arranged that the plunger like member 64 does not have sufficient stroke under such circumstances to engage the terminal 44. A suitable stop 78 in the form of a shoulder on the switch housing is provided to limit the movement of the members 60 and 64.

Kickdown switches and upper limit control switches generally are recognized as devices heretofore employed in the art. However, in certain transmissions it is desirable to provide means for retaining the member 64, contact 48 and terminal 44 in electrical contact after the accelerator pedal 16 has initiated a kickdown and subsequently been retracted to a more modified throttle opening position. A depending plate 82 is illustrated as hinged at 84 on the exterior of the switch housing. The plate 82 is provided with an opening 86 through which a reduced portion 88 of member 60 extends. The portion of plate 82 which is adjacent opening 86 abuts a shoulder 90 provided on member 60. The extension 89 of lever 28 engages plate 82 and moves member 60 to the left in Fig. 2 when pedal 16 is depressed to a predetermined position, such as wide open throttle position. If desired plate 82 may be provided with openings 92 or provided with a suitable configuration so that projections such as the illustrated screw heads on the switch housing do not interfere with its rotation. The hinge 84 is shown as carried by a plate 94 secured to the switch housing. A leaf spring element 96 is secured to plate 94 adjacent the lower portions of the switch housing and provided with an abutment 98. The plate 82 has an opening 100 through which element 96 projects. When extension 89 of lever 28 moves member 60 and plate 82 to the left sufficiently to engage contact 48 with terminal 44 the abutment 98 on spring element 96 snaps behind plate 82 to hold the switch parts in this position. Release of the switch parts is effected when the throttle is returned to a substantially closed throttle condition at which time a cam element 102 carried by lever 28 lifts the spring element 96 as an incident to the rotation of lever 28. This lifting movement releases plate 82 from abutment 98 and allows spring 72 to move member 60 to the right in Fig. 2 and rotate plate 82 in a counterclockwise direction. The spring element 96 may be provided with a depending lip 97 to limit the counterclockwise rotation of plate 82.

I claim:

1. A control for an electrical circuit of a motor vehicle having a throttle and linkage operable to control the throttle, said control including a switch having a housing, a first contact element and a second contact element, said second contact element having a portion thereof formed as a plunger and being slidably mounted in said switch housing for movement between a first position remote from said first contact element and a second position in electrical conducting relationship with said first contact element, said plunger having an exposed end which projects out of said housing, spring means normally urging said second contact element to its first position, a hinged plate carried by said housing and abutting the exposed end portion of said plunger, means associated with said linkage and operable to rotate said plate about said hinge and slide said plunger to said second position when said linkage is moved beyond a predetermined position in a direction tending to open said throttle, and latching means operable to engage said plate when said plunger reaches its second position and to retain said plunger in this position.

2. A control for an electrical circuit of a motor vehicle having a throttle and linkage operable to control the throttle, said control including a switch having a housing, a first contact element and a second contact element, said second contact element having a portion thereof formed as a plunger and being slidably mounted in said switch housing for movement between a first position remote from said first contact element and a second position in electrical conducting relationship with said first contact element, said plunger having an exposed end which projects out of said housing, spring means normally urging said second contact element to its first position, a hinged plate carried by said housing and abutting the exposed end portion of said plunger, means associated with said linkage and operable to rotate said plate about said hinge and slide said plunger to said second position when said linkage is moved beyond a predetermined position in a direction tending to open said throttle, latching means operable to engage said plate when said plunger reaches its second position and to retain said plunger in this position, and means carried by said linkage which is operable to release said latching means in response to movement of said linkage beyond a predetermined limit in a direction tending to close said throttle.

3. A control for an electrical circuit of a motor vehicle having a throttle and linkage operable to control the throttle, said control including a switch having a housing, a first contract element and a second contact element, said second contact element having a portion thereof formed as a plunger and being slidably mounted in said switch housing for movement between a first position remote from said first contact element and a second position in electrical conducting relationship with said first contact element, said plunger having an exposed end which projects out of said housing, spring means normally urging said second contact element to its first position, a hinged plate carried by said housing and abutting the exposed end portion of said plunger, means associated with said linkage and operable to rotate said plate about said hinge and slide said plunger to said second position when said linkage is moved beyond a predetermined position in a direction tending to open said throttle, a resilient strip carried by said housing and abutting an edge of said plate, said strip having an abutment thereon so positioned as to engage said plate when said plate has been rotated sufficiently to force said plunger to its second position and to retain said plunger in this position, and means carried by said linkage which is operable to deflect said strip to release said plate in response to movement of said linkage beyond a predetermined limit in a direction tending to close said throttle.

IRA M. HOLMES.

REFERENCES CITED

The following references are of record in the file of this patent:

UNITED STATES PATENTS

| Number | Name | Date |
| --- | --- | --- |
| 1,944,084 | Hutt | Jan. 16, 1934 |
| 2,396,551 | Boyce | Mar. 12, 1946 |